March 11, 1958 R. C. HUPP ET AL 2,826,436
FLUID SYSTEM SUBPLATE CONSTRUCTION
Filed Sept. 27, 1952 2 Sheets-Sheet 1

INVENTOR.
Robert C. Hupp
BY Nicholas R Kerns
Woodling and Krost
attys

March 11, 1958 R. C. HUPP ET AL 2,826,436
FLUID SYSTEM SUBPLATE CONSTRUCTION
Filed Sept. 27, 1952 2 Sheets-Sheet 2

INVENTOR.
Robert C Hupp
BY Nicholas R Kerne
Woodling and Krost
attys

United States Patent Office 2,826,436
Patented Mar. 11, 1958

2,826,436

FLUID SYSTEM SUBPLATE CONSTRUCTION

Robert C. Hupp, Birmingham, and Nicholas R. Kerns, St. Clair Shores, Mich., said Kerns assignor to said Hupp Application September 27, 1952, Serial No. 311,896

2 Claims. (Cl. 285—158)

This invention relates in general to fluid systems and their control, and relates more particularly to a subplate construction for the elimination of threaded ports in expensive valves and other fluid directing devices.

Those who have operated fluid systems, and particularly complicated machines operated by hydraulic control systems, are well acquainted with the complexity of operating such equipment by means of valves located at many places around and in conjunction with the equipment. It has long been the tendency for designers to bring all control valves to one convenient location. However, such centralizing of controls leads to congestion and difficult fitting connections, and consequently is usually not as satisfactory as could be desired. Furthermore, other fluid directing fittings must be employed on or in conjunction with fluid operated devices, and such fittings are expensive to provide with threaded ports, and are difficult to exchange quickly when connections thereto must be made by threaded connection directly into the fitting.

An object of this invention is to eliminate the necessity for providing threaded ports into fluid directing fittings.

Another object of this invention is to provide for rapid exchange of fluid fitting devices.

Another object of this invention is to provide an improved subplate device of simplified construction for manufacturing to precise limits with ordinary equipment.

Another object of this invention is to provide a subplate device with interchangeable inserts.

Another object of this invention is to provide a subplate device of any suitable support material, and with interchangeable fluid control inserts of a non-porous material.

Still another object of this invention is to provide an interlocking insert construction which does not require auxiliary holding equipment to keep the inserts non-rotatively held in the supporting subplate.

Another object of this invention is to eliminate porosity and seepage in subplate construction.

And another object of this invention is to provide compact piping connections and pipe joint elimination by the provision of an improved subplate construction.

And yet another object of this invention is to provide a fluid circuit subplate made of assembled parts to avoid destruction of the entire subplate if one connection is destroyed.

Other objects and a fuller understanding of the invention may be had by referring to the following description and claims, taken in conjunction with the accompanying drawings, in which:

Figure 1:
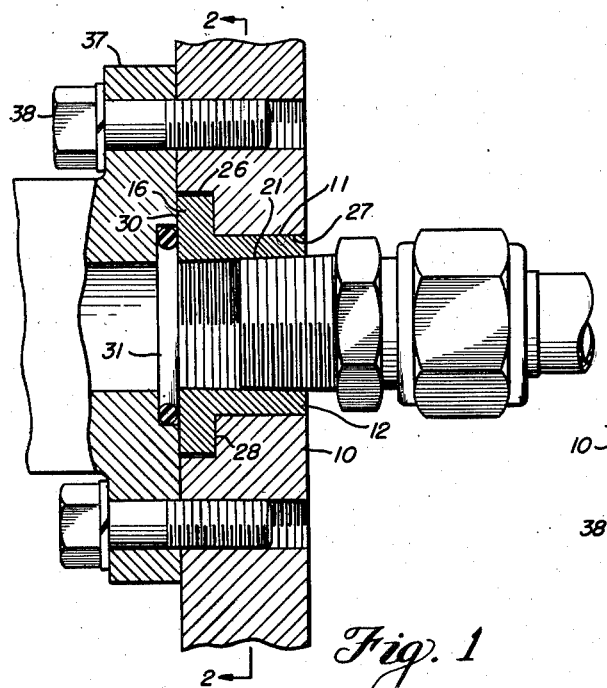
Figure 1 is a section through a portion of a subplate and fitting with a fluid line attachment according to the teaching of this invention.

The sections illustrated in the drawings are intended to be only an illustration of the principle being taught in this invention and not a teaching of exact application for all cases. By this is meant that there is only one line connection illustrated in each of the sections, and the fitting opposite the line connection is illustrated in a general manner. The fitting thus illustrated could be a valve or a machine to which the line is delivering fluid under pressure, a return bend, or any other desired type of fitting, including valves.

In Figure 1 of the drawings a panel subplate 10 is illustrated having two oppositely disposed sides. In other words, the subplate is merely a slab. The subplate or mounting plate 10 may be rolled stock, but a casting is believed to be the least expensive in most cases, and can be readily ground to a flat surface in order to provide a good base structure. Furthermore, cast iron castings are desirable for shock resistance and other desirable characteristics.

Regardless of what material may be selected for the subplate 10, a transverse opening 11 having a stepped wall is illustrated in the Figure 1. The stepped opening 11 is provided by a first bore portion 26 and a second bore portion 27 with a shoulder 28 therebetween. The surface or shoulder 28 may be referred to as a first side portion of the plate 10 which lies in a first plane.

An insert liner or first member 12 is provided to reside in the stepped opening 11. This liner has a flange portion and a body portion. The flange portion has an annular shoulder face which abuts the surface 28 and an interface surface 30. The flange has external stop surface means extending between the surface 28 and the surface 30. The insert liner 12 is preferably made of steel turned to proper size to closely fit the stepped opening 11. Although the fit is preferably relatively close, there is no necessity for any type of precision and the insert 12 may actually rock somewhat in the opening 11. The opening 11 serves merely as a convenient holding device for the insert liner 12, and a spacing device to space a plurality of such liners in proper relationship with respect to one another. For example, if a plurality of fluid lines were employed in conjunction with one valve, then the openings 11 would properly space the insert liners 12 to register with the valve openings.

Figure 3:
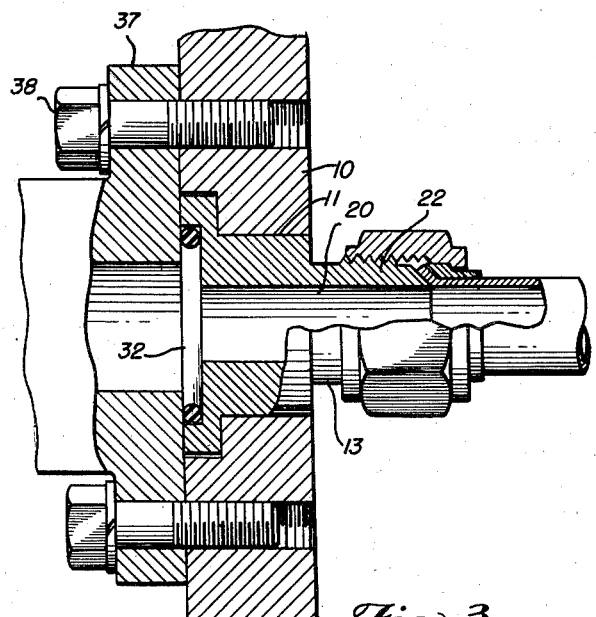
Figure 3 is a section through a portion of a subplate and fitting with an alternate type of fluid line attachment device.

As best illustrated in Figure 3, the insert liner 12 has a centrally located fluid passageway 20 therethrough. It is to be understood, of course, that subplates may be made in standard production sizes and with a standard number of openings. In some cases the insert liner will be a solid plug with no opening and with no connection thereto. In Figure 1 of the drawings the insert liner 12 has an internal thread 21 serving as a fluid line attachment means, whereas in Figure 3 of the drawings there is illustrated a modified form of insert liner referred to by the reference character 13. The insert liner 13 is provided with a threaded stud 22 wherein the external threads on the stud 22 serve as a fluid line attachment means. In Figure 1 the male threaded end of a standard fluid line coupling may be inserted into the fluid passageway 20 and turned tight with the threads 21 to provide a means for attaching a hydraulic or other fluid line thereto. In Figure 3 of the drawings the threaded stud 22 takes the place of one part of the fluid line fitting, and only the turn nut and cooperating structure of the fitting need be used.

Referring now to the side of the subplate 10 opposite from the fluid line attachment, there is illustrated a fitting or second member 37. This fitting may be referred to as a body member. As previously indicated, the fitting 37 illustrates in a general manner any suitable or desired device which may be used to receive fluid under pressure. This second member has an interface surface which abuts the interface of the first member and which lies in a second plane. The most common example would be a fluid valve. In such instance there would be at least two insert liners to receive fluid lines, and there would be at least two registering passageways into the fitting 37. However, many control valves on modern machines have many such openings for the direction of fluid from one source into a plurality of lines. There is no limitation upon the number of fluid lines which may be brought to the improved subplate constructed according to this invention. There may be more than one fluid pressure source, and there may be any desired number of lines leading from the subplate to the device being operated.

In any event, it is necessary to produce a good fluid seal between the fitting 37 and the fluid line coming into the subplate. In Figure 1 of the drawings the insert liner 12 is provided with a flange 16 having a smooth machined face 30. The insert liner 12, as previously explained, will be non-porous to fluids under high pressure because it may be made of rolled steel which is impervious to the passage of such fluids. The shoulder 28 may be very accurately spaced by placing the cast or rolled subplate 10 in a convenient fixture on a drill press or boring machine. Then by providing accurate dimensions on the insert liner 12, the face or interface surface 30 will be positioned in an exact plane with every other face 30 of every insert liner 12 inserted into and through the subplate 10. It will be seen, therefore, that the various faces 30, being the only areas of importance insofar as accurate facing is concerned, may be quite readily and inexpensively provided by screw machine operation, or similar well-known and understood machine shop practice, and because the shoulder 28 may be quite easily and accurately provided, the provision of the areas around the fluid passageways are quite simple and easy to provide by the improved construction of this invention. Furthermore, an important advantage which may not be at first apparent is the fact that there is no accurate and precise work being performed on the subplate 10 which may lead to the scrapping of the subplate 10 after a considerable amount of expensive work has been performed. For example, in attempts to provide a subplate prior to this invention, the passageway 11 was drilled through the subplate, and the sides of the subplate were then accurately machined to provide flat surfaces. Thereafter, prior to this invention, the lateral openings were threaded to provide means for attaching fittings to receive the fluid lines and fittings to serve the valve. Inaccurate machining of threads on any one of the many openings, or damage to the threads in service, necessarily meant the scrapping of the entire subplate. Often the final passageway would be destroyed, and all of the previous work in providing threads in many passageways, and providing flat sides, immediately became lost. With previous subplate construction if the threads become unserviceable or damaged while in service, the machine must be shut down until all lines are disconnected and the entire subplate removed and replaced. This invention provides for rapid and convenient production of inserts separate from the production of the subplate 10, which may then be inserted into the subplate 10 merely as a holder and spacer. Therefore, scrapping of one of the inserts does not lead to the destruction of any other inserts, and in service one line is disconnected and one insert may be quickly removed and replaced to put the system back into service in a short period of time.

In Figure 1 of the drawings a gasket chamber or counterbore having first and second counterbore surfaces 31 is illustrated with an O-ring therein for sealing between the face 30 of the insert 12 and the fitting 37. This counterbore comprises annular seal receiving means. The O-ring will have no difficulty in forming a perfect seal between the fitting 37 and the insert liner 12 because of the precise location of the various surfaces 30 in the plurality of insert liners. The fitting 37 is held in tight contact with the several surfaces 30 by means of a plurality of convenient bolts 38. The counterbore may also be referred to as an annular chamber.

In Figure 3 of the drawings there is illustrated the provision of the chamber 32 in the insert liner rather than in the valve itself. Such construction is merely a convenient reversal from that illustrated in Figure 1.

The Figures 1, 3, 5, and 7 each illustrates an insert liner having a different characteristic, but all within the basic teaching of this invention. The insert liners in these four drawings are referred to respectively as insert liners 12, 13, 14, and 15.

Figure 2:
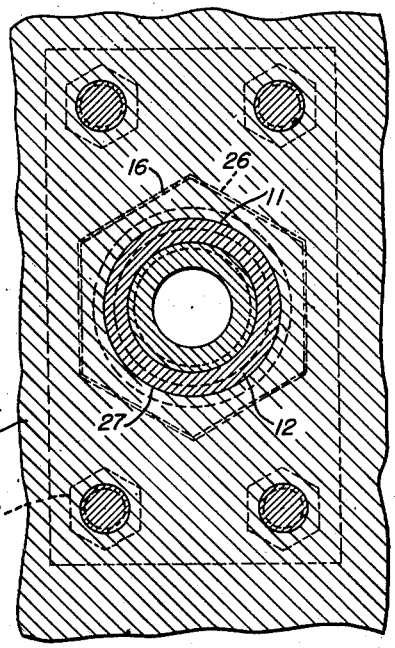
Figure 2 is a section taken along line 2—2 of Figure 1.

It has been found that the use of insert liners as referred to by this teaching serves the purpose of the insert liners much more effectively if they are held non-rotatively in the opening in which they reside, in order that the fluid lines may be attached and disconnected without moving of the fitting 37. As best illustrated in Figure 2 of the drawings, the first bore 26 of the stepped opening 11 is non-circular in order that the interfitting flange 16 cannot turn in the bore. In Figures 1 and 2 there is no cavity for holding the sealing gasket.

Figure 4:
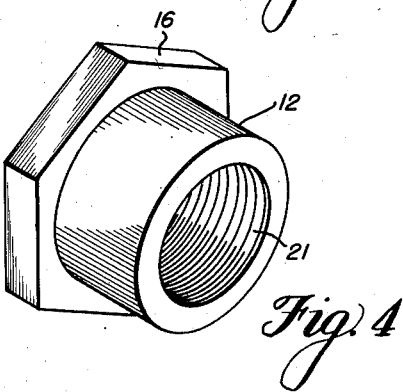
Figure 4 is a perspective view of an insert liner of the type shown in Figure 1.

The form of the insert liner 12 is best illustrated in the Figure 4 of the drawings.

Figure 6:
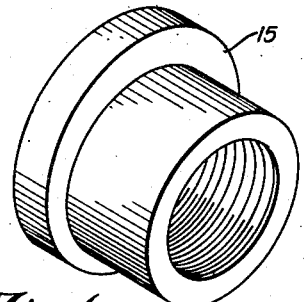
Figure 6 is a perspective view of an alternate type of insert liner.
Figure 7:
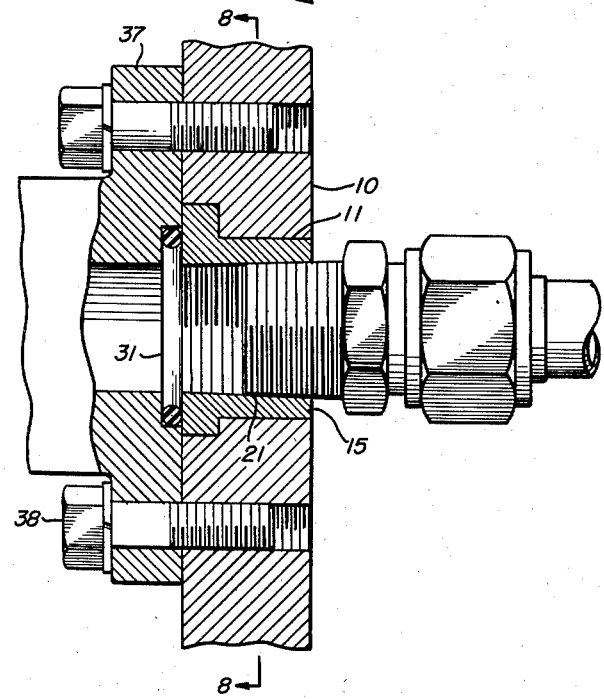
Figure 7 is a section through a portion of a subplate wherein the insert liner of Figure 6 is employed.
Figure 8:
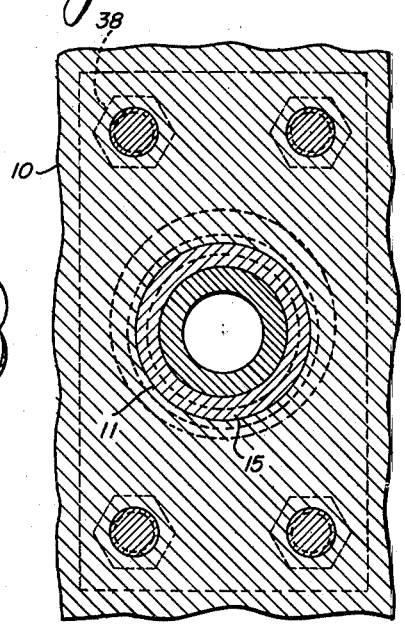
Figure 8 is a section taken along line 8—8 of Figure 7.

In Figures 7 and 8 of the drawings, as well as in the perspective view of Figure 6, an alternate construction is illustrated wherein the flange of the insert liner is non-concentric with respect to the fluid passageway 20 therethrough, and in such instance the first bore 26 is made in non-concentric manner in order to prevent rotation of the insert liner in the transverse opening.

Figure 5:
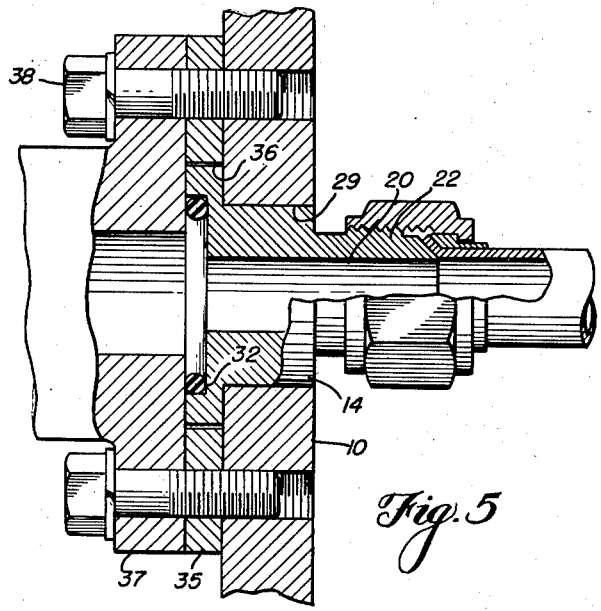
Figure 5 is a section through a portion of a subplate with a lock plate structure.

In Figures 3 and 5 the chamber 32 is provided in the insert liner rather than in the fitting 37.

It will now be apparent that the insert liners may be made in any suitable combination of particular features, but all serving basically the same purpose. The liners may have non-circular heads or non-concentric heads; they may be provided with chambers for receiving the packing or with smooth surfaces and the chamber provided in the mating fitting; or they may be provided with internal threads to receive a complete fitting, or provided with a threaded stud to receive a partial fitting.

Another feature of this invention is illustrated in Figure 5 of the drawings. It may be inconvenient in some instances to provide accurately machined shoulders 28 in a stepped opening 11, and consequently the subplate 10 of Figure 5 is illustrated as having a straight opening 29 therethrough. In order to provide the non-rotative feature for the particular insert liner employed, a lock plate 35 having first and second parallel side walls and having non-circular or non-concentric openings 36 therein is inserted between the fitting 37 and the subplate 10 to cooperate with the flange of the insert liner and present rotation of the insert liner in the opening 29. Any of the lines of Figures 4 or 6 may be used with this lock plate 35.

Although the invention has been described in its preferred for with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid connection comprising a plate having a first side portion lying in a first plane, said plate having an opening extending from said first side portion therethrough, an insert member having a longitudinally extending body portion and a laterally extending flange portion, said flange portion having an annular shoulder face and having an interface surface, said annular shoulder face and said interface surface lying in spaced parallel planes, said flange portion having external stop surface means extending between said annular shoulder face and said interface surface, said insert member having a bore extending from said interface surface through said flange and body portions, said longitudinally extending body portion of said insert member residing in said opening in said plate with said annular shoulder face of said insert member engaging said first side portion of said plate and lying in said first plane to limit movement of said insert member into said opening, a body member having a fluid conducting passage therein and an interface surface lying in a second plane, a lock plate disposed between said first and second planes and surrounding said external stop surface means of said flange to thereby prevent relative rotation between said plate and said insert member, said lock plate having first and second parallel side walls, said first side wall of said lock plate, said interface surface of said insert member and said interface surface of said body member lying in the same plane, said second side wall of said lock plate lying in said first plane in engagement with said first side portion of said plate, means securing said interface surface of said body member into tight engagement with said interface surface of said insert member and said first side wall of said lock plate, said interface surfaces of said insert member and said body member forming an annular juncture, one of said insert and body members having an annular chamber with first and second surfaces, said first surface meeting with said interface surface of said one of said members, said second surface meeting with said first surface and being spaced from said interface surface of the other of said members, said first and second surfaces and said interface surface of said other of said members comprising annular seal receiving means communicating with said annular juncture, an annular seal member residing in said annular seal receiving means and having surface portions, respectively, engaging said first and second surfaces and said interface surface of said other of said members to provide a fluid tight seal at said annular juncture.

2. A fluid connection comprising a plate having a first side portion lying in a first plane, said plate having an opening extending from said first side portion therethrough, an insert member having a longitudinally extending body portion and a laterally extending flange portion, said flange portion having an annular shoulder face and having an interface surface, said annular shoulder face and said interface surface lying in spaced parallel planes, said flange portion having external stop surface means extending between said annular shoulder face and said interface surface, said insert member having a bore extending from said interface surface through said flange and body portions, said longitudinally extending body portion of said insert member residing in said opening in said plate with said annular shoulder face of said insert member engaging said first side portion of said plate and lying in said first plane to limit movement of said insert member into said opening, a body member having a fluid conducting passage therein and an interface surface lying in a second plane, a lock plate disposed between said first and second planes and surrounding said external stop surface means of said flange portion to thereby prevent relative rotation between said plate and said insert member, said lock plate having first and second parallel side walls, said first side wall of said lock plate, said interface surface of said insert member and said interface surface of said body member lying in the same plane, said second side wall of said lock plate lying in said first plane in engagement with said first side portion of said plate, means securing said interface surface of said body member into tight engagement with said interface surface of said insert member and said first side wall of said lock plate, said interface surfaces of said insert member and said body member forming an annular juncture, said insert member having a counterbore with first and second counterbore surfaces, said first counterbore surface meeting with said interface surface of said insert member, said second counterbore surface meeting with said first counterbore surface and being spaced from said interface surface of said body member, said first and second counterbore surfaces and said interface surface of said body member comprising annular seal receiving means communicating with said annular juncture, an annular seal member residing in said annular seal receiving means and having surface portions, respectively, engaging said first and second counterbore surfaces and said interface surface of said body member to provide a fluid tight seal at said annular juncture.

References Cited in the file of this patent

UNITED STATES PATENTS

| | | |
|---|---|---|
| 833,007 | Slick | Oct. 9, 1906 |
| 1,048,347 | Rowland | Dec. 24, 1912 |
| 1,915,088 | Eastburg | June 20, 1933 |
| 1,977,240 | Parker | Oct. 16, 1934 |
| 2,422,597 | Stewart | June 17, 1947 |
| 2,471,118 | Patterson | May 24, 1949 |
| 2,589,136 | Ralston | Mar. 11, 1952 |
| 2,676,037 | Mueller | Apr. 20, 1954 |

FOREIGN PATENTS

| | | |
|---|---|---|
| 410,080 | Germany | Feb. 20, 1925 |